United States Patent [19]

Daniel et al.

[11] 4,246,309

[45] Jan. 20, 1981

[54] TUFTED FLOOR COVERING HAVING BINDER WITH LESS THAN 0.5% WATER SOLUBLE COMPOUNDS

[75] Inventors: Jean-Claude Daniel, Fontenay-sous-Bois; Jacques Grossoleil, Paris; Robert Roullet, Lyon, all of France

[73] Assignee: Rhone-Poulenc Industries, Paris, France

[21] Appl. No.: 898,955

[22] Filed: Apr. 21, 1978

[30] Foreign Application Priority Data

Apr. 22, 1977 [FR] France .................. 77 12160

[51] Int. Cl.³ .......................................... B32B 27/06
[52] U.S. Cl. ........................................ 428/95; 428/96; 428/97
[58] Field of Search ................. 428/85, 95, 96, 97; 260/29.6

[56] References Cited

U.S. PATENT DOCUMENTS

| | | | |
|---|---|---|---|
| 3,779,799 | 12/1973 | Kennedy | 428/95 |
| 4,055,694 | 10/1977 | Hadgraft | 428/95 |
| 4,098,944 | 7/1978 | Pollock | 428/95 |

FOREIGN PATENT DOCUMENTS 2269542 11/1975 France .

*Primary Examiner*—Marion McCamish
*Attorney, Agent, or Firm*—McDougall, Hersh & Scott

[57] ABSTRACT

Aqueous latex base binder of a synthetic polymer for manufacturing tufted floor covering having improved wear-resistance. The content of hydrosoluble compounds dissolved in the aqueous phase in the latex is less than 0.5% by weight in relation to the polymer.

8 Claims, 1 Drawing Figure

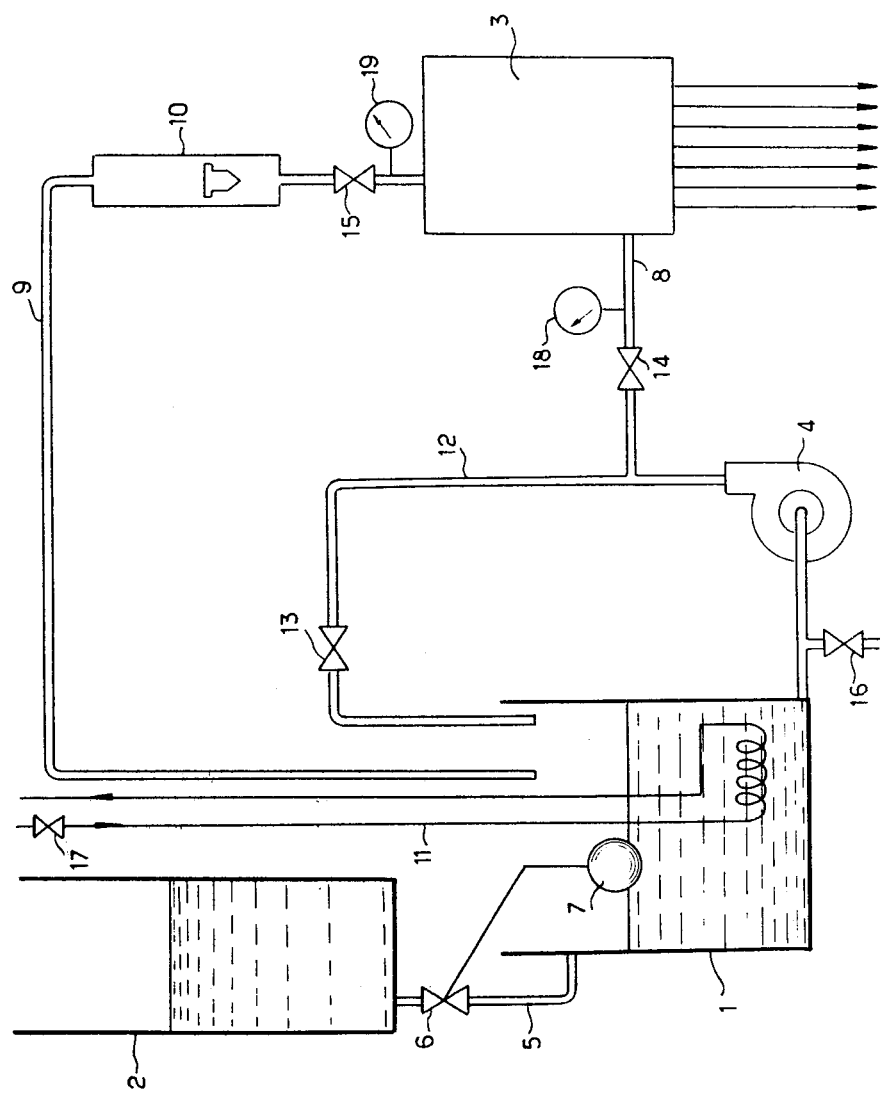

TUFTED FLOOR COVERING HAVING BINDER WITH LESS THAN 0.5% WATER SOLUBLE COMPOUNDS

The present invention relates to an aqueous latex base binder of a synthetic polymer used in manufacturing tufted floor covering. It also relates to the tufted floor coverings produced by means of the aforementioned binder.

Due to the increase in use of flooring intended for domestic use, such as indoor floor and wall coverings, outdoor flooring and automobile floor coverings, just to name a few, consumption has increased of synthetic polymer aqueous latexes as textile fiber binders used in manufacturing tufted floor covering.

Due to the various types of tufted floor covering (flat, looped vertical, cut vertical), the numerous binding processes (full bath impregnation, back-controlled impregnation, pulverization, etc.) and the variety of fibers used (wool, polypropylene, polyamides, polyesters, acrylic polymers), the manufacturers of synthetic latex binders have had to provide a more extensive selection of latexes.

The quality of latexes used as binders is steadily improving because it is necessary that tufted floor coverings which, for economic reasons are composed of less and less fibers, be maintained wear-resistant.

The binders in the invention have an aqueous latex base of a synthetic polymer, in which the hydrosoluble compounds dissolved in the aqueous phase is less than 0.5% by weight in relation to the polymer.

Hydrosoluble compounds primarily include salts formed, for example, by catalytic residues, surface-active agents and macromolecular compounds such as carboxyl compounds.

It has been found that, all things being equal in other respects, latexes with a sufficiently low content of hydrosoluble compounds dissolved in the aqueous phase lead to tufted floor coverings with improved wear-resistance.

The following can be cited as synthetic polymers usable as latexes according to the invention: styrene-butadiene copolymers, carboxylated-styrene-butadiene copolymers, alkyl acrylate-styrene copolymers, carboxyl alkyl acrylate-styrene copolymers, alkyl acrylate-alkyl acetate copolymers, carboxyl alkyl acrylate-alkyl acetate copolymers, alkyl acrylate-vinyl chloride copolymers, carboxyl alkyl acrylate-vinyl chloride copolymers, vinylidene chloride-vinyl chloride copolymers, carboxyl vinylidene chloride-vinyl chloride copolymers.

The content in the latex of hydrosoluble compounds dissolved in the aqueous phase can be estimated by using the method hereinafter described in which semi-permeable membranes with high cutoff are used to let low-molecular-weight compounds flow therethrough and, if need be, carboxyl macromolecular compounds, while preventing passage of polymer particles.

The latex to be tested, having a ponderal dry material content $t_l$, expressed in percent by weight, undergoes ultrafiltration by passing through a laboratory ultrafiltration module equipped with a semi-permeable membrane marketed by Rhone-Poulenc Industries of France under the tradename: "Iris 3538". The ponderal dry material content is determined from the first drop of permeate collected $t_p$, expressed in percent by weight, which equals that of the aqueous phase of the latex.

The content in the latex of hydrosoluble compounds dissolved in aqueous phase $t_s$, expressed in percent by weight in relation to the polymer is obtained by the formula:

$$t_s = \frac{t_p(100 - t_1)}{t_1}$$

A latex usable as a binder according to the invention is usually obtained from a latex of a synthetic polymer which is known to be usable for binding tufted floor coverings and which is prepared by any known aqueous emulsion polymerization process, and by eliminating from the latter a sufficient quantity of the aforementioned hydrosoluble compounds. For example, these can be eliminated by ultrafiltration through a semi-permeable membrane. As ultrafiltration progresses, the compounds dissolved in the aqueous phase flow through the membrane in the permeate while the hydrosoluble compounds adsorbed at the surface of the latex particles are progressively desorbed and eliminated. The ultrafiltration operation can be carried out in a conventional unit of a type commonly employed in industry.

A cross-section of this type of unit is shown in the attached FIGURE. Basically, it consists of tank 1 containing the latex to be processed, tank 2 containing deionized water, ultrafilter 3 and pump 4. Tank 1 is fed by tank 2 which supplies deionized water through pump 5; and automatic valve 6, actuated by float 7, maintains constant the level of the bath contained in tank 1. Pump 4 ensures latex flow through pipe 8 toward ultrafilter 3. Through pipe 9, on which flowmeter 10 is fitted, the concentrate delivered by ultrafilter 3 is recycled into tank 1. Heat exchange fluid, circulated through coil 11 immersed in the latex contained in tank 1, maintains it at a constant temperature. Pipe 12 is used to maintain the unit in stable working conditions.

The unit is also equipped with shut-off valves 13, 14, 15, 16 and 17 and manometers 18 and 19.

The maintenance of stable working conditions and the operation proceed as follows: With valve 14 closed and valve 13 open, pump 4 is turned on; then valves 14 and 15 are opened and valve 13 closed. By successive approximations, the opening of valves 14 and 15 is regulated so as to obtain the desired flow of latex at the desired pressure, the pressure differences indicated by manometers 18 and 19, representing the pressure drop in ultrafilter 3.

To ensure good operation of the ultrafiltration technique, it is advantageous in accordance with the practice of the invention to respect the following conditions:

The semi-permeable membrane must have a high cutoff, generally between 5000 and 10000, expressed as the molecular-weight-value of standard proteins in a neutral, buffered medium.

The flow rate of the latex on the membrane must be higher than 0.5 m/s (meters per second), and preferably between 1 and 2 m/s, to prevent the membrane from clogging, at the same time, it limits the pressure drop in the ultrafilter and also the shearing which the latex undergoes.

The pressure differences on each side of the membrane must be between 0.1 and 6 bars, and preferably between 1.5 and 3 bars.

The temperature of the latex must be between 0° and 100° C., and preferably between 0° and 50° C.

Since the flow rate of the permeate decreases as the ponderal dry material content of the latex increases, it is preferable to accomplish ultrafiltration with a perceptibly constant ponderal content, generally between 5 and 70%, and preferably between 45 and 55%, possibly after dilution especially if the latex viscosity is very high.

Unit shutdown must be followed by an adequate cleaning cycle with pure water to prevent irreversible clogging, hence destroying the membrane.

If the mechanical stability of the latex is insufficient to permit ultrafiltration without forming agglomerates, one can proceed by first of all bringing the latex to an alkaline pH value of usually between 7.5 and 9.5. After ultrafiltration is completed, the latex can be concentrated, if need be, until its dry material content is suitable for the intended usage.

The following examples are provided to illustrate the invention.

EXAMPLES 1 and 2

Example 1 is given for comparative purposes. Example 2 illustrates the invention.

Complete impregnation of a tufted sheet, consisting of a surface coat of polypropylene and an undercoat of knitted-goods waste, is carried out with a binder. The sheet is then sized at a pressure of 5 kg/cm2 and then dried in a tunnel furnace at 130° C. for 10 minutes.

The treated sheet is tested for wear-resistance by the following three tests:

Writing Test: A streak is made on the top side of a sample of the sheet with a metallic object which leaves a whitish trace. The degree of this trace is determined visually and compared with a standard range of samples. The results are given in grades ranging from 1 to 10; the higher the grade, the fainter the streak on the sample.

Whiteness Test: The wear layer of a sample of the sheet undergoes repeated, standardized hammering which leaves it more or less shiny and whitened. The hammering is done with a device commercially known as the "British Tetrapod Walker" (BTW). This device primarily consists of a hollow, rotating cylinder, on the inner surface of which a test sample is applied, and also inside of which is a hammer, in a free state, with four ball-shaped striking masses fitted at the top of a regular tetrahedron. After the cylinder has completed several cycles, in this case $10^5$ cycles, the effect on the sample is determined visually by comparison with a standard range of samples. The results are given in grades ranging from 1 to 10; the higher the grade, the less the hammering has effected the sample.

Lisson Test: The wear layer of a sample of the sheet undergoes abrasion caused by a mechanical walker known in industry under the tradename "Lisson pedal wheel". This device primarily consists of a wheel equipped at its periphery with 4 shoes (sabots in French), covered with a rubber-shoe-sole with a Wellen standardized profile; in this case, the shoes weigh a total of 13 kg, and their action causes the surface fibers to become more or less tousled. As it rotates, the wheel moves back and forth from one end of the sample to the other, accomplishing one cycle per round trip. The degree of tousling is determined visually after a given number of cycles, in this case 200 cycles, by comparison with a standard range of sample. The results are given in grades ranging from 1 to 10; the higher the grade, the lower the degree of tousling.

In Examples 1 and 2, the binders used are aqueous latexes A and B, respectively, of carboxylated styrenebutadiene copolymer, composed of 43% butadiene, 53% styrene and 4% ethylene carboxylic acids by weight.

The content in the latex of hydrosoluble compounds dissolved in the aqueous phase, by weight with respect to the polymer, is 4.7% for latex A and 0.3% for latex B.

Latex B was obtained from latex A, with 50% dry material by weight, by subjecting the latter to the ultrafiltration process as hereinafter described.

Ultrafiltration takes place in a unit with an ultrafiltration surface area of 0.7 m$^2$. The unit is equipped with a membrane with a cutoff of 20000, which is marketed by Rhone-Poulenc Industries in France under the tradename "Iris 3538", and is fed by a pump capable of supplying 6 m$^3$/h at a pressure of 3 bars. During ultrafiltration, the dry material content in the latex is maintained constant with deionized water. After drainage, the unit is flushed clean with water. No clogging of the membrane is noticed.

Latexes A and B are brought to a pH of 9 by adding ammonia, are diluted with 0.4% by weight, with respect to the polymer, of sodium alkylarylsulfonate, an emulsifying agent, the function of which is to improve the wettability of the sheet fibers, and are diluted with deionized water to a ponderal dry material content of 20% by weight.

The following table shows the results obtained for each example. It also shows the weight of the binder deposited.

|  | EXAMPLE 1 | EXAMPLE 2 |
| --- | --- | --- |
| Weight of binder deposited in g/m2 | 130 ± 9 | 120 ± 12 |
| in % with respect to the sample | 20 ± 1 | 19 ± 2 |
| Writing Text | 6 | 7.5 |
| Whiteness Test | 4.5 | 7.5 |
| "Lisson" Test | 7.5 | 8.5 |

It can be seen that latex B, used as a binder according to the invention, leads to a tufted sheet with better properties than the one impregnated with latex A.

We claim:

1. Tufted floor coverings comprising a tufted fibrous sheet bonded with an aqueous latex base binder of a synthetic polymer in which the content in the latex of water soluble compounds dissolved in the aqueous phase is less than 0.5% by weight in relation to the polymer.

2. A tufted floor covering according to claim 1, characterized by the fact that the polymer is selected from the group consisting of styrene-butadiene copolymers, carboxyl styrene-butadiene copolymers, alkyl acrylate-styrene copolymers, carboxyl alkyl acrylate-styrene copolymers, alkyl acrylate-vinyl acetate copolymers, carboxyl alkyl acrylate-vinyl acetate copolymers, alkyl acrylate-vinyl chloride copolymers, carboxyl alkyl acrylate-vinyl chloride copolymers, vinylidene chloride-vinyl chloride copolymers, carboxyl vinylidene chloride-vinyl chloride copolymers.

3. A tufted floor covering according to claim 1, in which the latex was obtained from a latex of a synthetic polymer prepared by emulsion polymerization from which a sufficient quantity of water soluble compounds was removed.

4. A tufted floor covering as claimed in claim 3, in which water soluble compounds are eliminated by ultrafiltration through a semi-permeable membrane.

5. A tufted floor covering as claimed in claim 4, in which the membrane has a cutoff between 5000 and 100000, expressed in molecular-weight-value of standard proteins in a neutral, buffered medium.

6. A tufted floor covering as claimed in claim 4, in which the ultrafiltration is carried out with a perceptibly constant ponderal weight in the latex of dry material of between 5–70%.

7. Tufted floor covering as claimed in claim 6, in which the ponderal content of dry material in the latex is between 45–55%.

8. A tufted floor covering as claimed in claim 4, in which when ultrafiltration is completed, the latex is concentrated until its content in dry material is suitable for the intended usage.

* * * * *